(No Model.)
F. W. ALTPETER.
DRAFTSMAN'S RULE.
No. 521,597. Patented June 19, 1894.
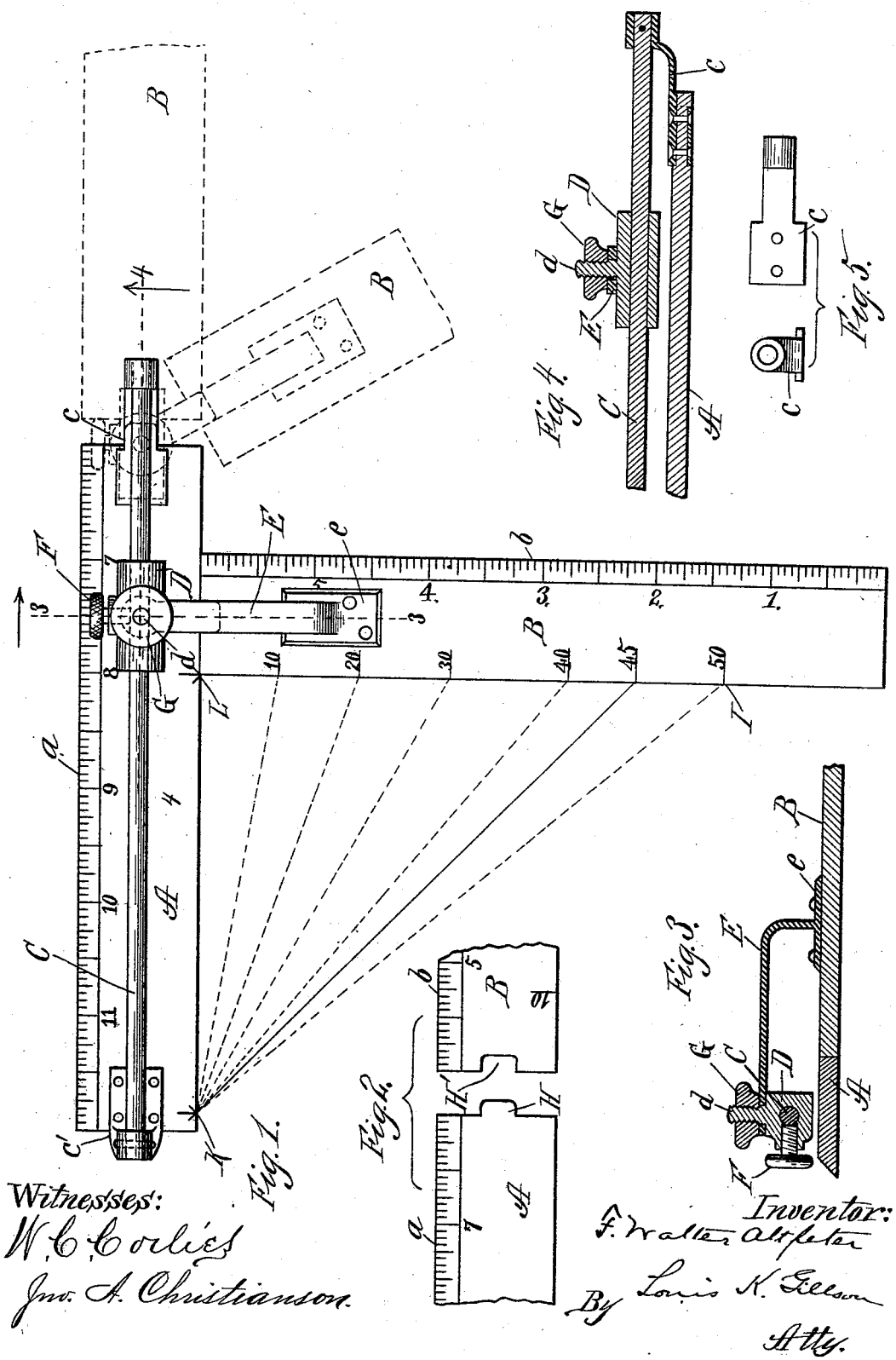
Witnesses:
W. C. Corlies
Jno. A. Christianson
Inventor:
F. Walter Altpeter
By Louis K. Gillson
Atty.

UNITED STATES PATENT OFFICE.

FRANCIS WALTER ALTPETER, OF CHICAGO, ILLINOIS.

DRAFTSMAN'S RULE.

SPECIFICATION forming part of Letters Patent No. 521,597, dated June 19, 1894.

Application filed February 19, 1894. Serial No. 500,642. (No model.)

*To all whom it may concern:*

Be it known that I, FRANCIS WALTER ALTPETER, a citizen of the United States, residing at Chicago, in the county of Cook and State of Illinois, have invented certain new and useful Improvements in Draftsmen's Rules; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to rules for draftsmen's use and has for its purpose the construction of a rule which may be put to a variety of uses, combining in itself the utility of several tools now used.

The invention consists of the use of a rule having two members, preferably of equal length, which may be used together as a straight edge or turned one upon the other to an angular position, one member being adapted to slide upon the other when in the angular position for convenience in ruling section lines, &c., and affording a convenient method of measuring angles.

In the drawings, I show in Figure 1, a plan view of the tool, the members being arranged in angular position and the movement of the one upon the other being indicated in dotted lines; Fig. 2, a plan view of the abutting ends of the members, with their uniting mechanism removed; Fig. 3, a vertical view on the line 3—3 of Fig. 1; Fig. 4, a similar view on the line 4—4 of Fig. 1; Fig. 5, details of a part of the uniting mechanism.

The members, A, B, when arranged with their ends abutting form an ordinary rule presenting a straight edge, *a*, *b*, which may be marked with the scale of linear inches. As shown these members are each six inches in length, and the scale runs from the remoter end of section B, to the remoter end of section A. A slide rod, C, is carried by section A, being mounted in standards or supports, *c*, *c'*, at its ends, so as to be a little above and parallel with the face of the rule and to coincide with its central longitudinal line. The standard, *c*, is located adjacent to, and is formed to project beyond that end of section A which abuts against section B. A sliding block, D, is carried by the rod C, and is provided with a set screw, F, for locking it in any desired position upon the rod. An arm, E, is secured to the upper surface of section B by a plate, *e*, near its inner end and projects beyond its end, lying along the median line of this section and being offset near its fixed end so that its main portion is parallel with the surface of the rule and elevated above it. The outer end of the arm, E, is apertured to fit over a stud *d*, standing up from the block, D. The stud, *d*, is screw-threaded and a jam nut, G, is fitted to it so as to bear upon the top of the arm, E, and bind it to the block, D. The length of the arm, E, is such that when the member, B, is perpendicular to the member, A, the end of the former is held in sliding contact with the edge of the latter. The block, D, is formed of considerable width so that the arm, E, has sufficient bearing upon it to insure firmness when the nut, G, is turned down. When the member, B, is moved to the end of the member A at which the standard, *c*, is located, so that its median line coincides with the end of member, A, and the nut, G, has been loosened, it may be turned upon the stud, *d*, as indicated by dotted lines, to bring the two members into alignment. The ends of the two members will now be spaced apart but may be brought together by sliding the block, D, back upon the rod, C. A tongue, H, may be formed upon the end of the member, A, and a corresponding groove in the adjacent end of the member, B, so that when the two ends are brought together the rule will be more firmly held against lateral flexure. When the two members are in the relative positions shown in solid lines, Fig. 1, perpendiculars and parallels may be drawn. For section lining a faint base line may be drawn to which the member, A, may be held, and the nut, G, being loosened the member, B, may be gradually moved along. A graduated scale may be marked upon the side of member A, along which member B, slides, and a uniform spacing of section lines is thereby secured.

For drawing angles member, B, may have one of its edges marked with a scale of degrees as indicated at I. This edge should be placed at a point on the member A indicated at L, and will then be tangential to a circle struck from a point, K, on the member, A. The angle will be drawn by running a line between the points, K, and L, and between the point K and the mark upon the adjacent edge of member B, indicating the degree of the angle desired.

I claim as my invention—

1. In a draftsman's rule the combination of the members, A, B, the rod, C, mounted above the member A, and projecting beyond one of its ends, a block, D, adapted to slide upon the rod, and an arm, E, rigidly attached to the member, B, and pivotally attached to the block, D, substantially as described and for the purpose specified.

2. In a draftsman's rule the combination of the two members, A, B, adapted to be joined end to end and form a continuous straight edge, a slide rod fixed to one of the members as A, along its longitudinal median line, and projecting beyond one of its ends, a slide block carried by the rod, a rigid arm fixed to the other member, as B, and pivotally connected with the slide block, and means for locking the arm upon the block and means for locking the block upon the rod, substantially as described and for the purpose specified.

In testimony whereof I affix my signature in presence of two witnesses.

F. WALTER ALTPETER.

Witnesses:
LOUIS K. GILLSON,
M. H. L. WING.